United States Patent [19]

Uedaira et al.

[11] Patent Number: 4,585,718
[45] Date of Patent: Apr. 29, 1986

[54] LITHIUM-MANGANESE DIOXIDE CELL

[75] Inventors: Satoru Uedaira; Yoriko Sameshima; Hidemasa Tamura, all of Kanagawa, Japan

[73] Assignee: Sony Corporation, Tokyo, Japan

[21] Appl. No.: 705,677

[22] Filed: Feb. 26, 1985

[30] Foreign Application Priority Data

Mar. 6, 1984 [JP] Japan .................................. 59-41406

[51] Int. Cl.$^4$ ............................................. H01M 4/50
[52] U.S. Cl. .................................. 429/224; 252/182.1; 423/605
[58] Field of Search ................. 429/224, 194; 423/599, 423/605; 252/182.1

[56] References Cited

U.S. PATENT DOCUMENTS

| | | | |
|---|---|---|---|
| 2,716,078 | 8/1955 | Welsh | 423/599 |
| 2,739,914 | 3/1956 | Babbitt et al. | 423/599 |
| 4,133,856 | 1/1979 | Ikeda et al. | 429/224 X |
| 4,221,853 | 9/1980 | Tye et al. | 429/224 |
| 4,277,360 | 7/1981 | Mellors et al. | 429/224 |
| 4,297,231 | 10/1981 | Kahara et al. | 423/599 X |
| 4,312,930 | 1/1982 | Hunter | 429/224 X |
| 4,405,699 | 9/1983 | Kruger | 429/224 |

Primary Examiner—Anthony Skapars
Attorney, Agent, or Firm—Hill, Van Santen, Steadman & Simpson

[57] ABSTRACT

A lithium-manganese dioxide cell comprising a cathode composed of manganese dioxide, an anode composed of metal lithium and an electrolyte interposed therebetween. The manganese dioxide having an X-ray diffraction peak in the vicinity of a diffraction crystal lattice distance $d = 3.60$ Å analyzed after discharging in a cell.

The manganese dioxide may be prepared by the steps of adding nitric acid to electrolytic manganese (EMD), chemical manganese dioxide (CMD), a product obtained by heat-treatment of EMD or CMD, a product obtained by thermal decomposition of EMD or CMD, or a product by thermal decomposition of manganese nitrate, and heat-treating the resulting mixture.

13 Claims, 11 Drawing Figures

LITHIUM-MANGANESE DIOXIDE CELL

BACKGROUND OF THE INVENTION

1. Field of the Invention

This invention relates to a cathode active material suitably employed in a so-called Li-MnO$_2$ cell (lithium-manganese dioxide cell) making use of metal lithium as anode active material.

2. Description of the Prior Art

The lithium cell making use of metal lithium as anode active material is known as being of the high energy density type because of the large capacity per unit weight of metal lithium, the cell also having a cell voltage as high as approximately 3 V because of the potential of metal lithium. Since the lithium cell can be easily reduced in size and weight while assuring a high energy density, it is increasingly used for example as a backup power supply for an IC memory.

It is known that, in this type of the cell, the selection of the cathode active material is critical and may govern cell characteristics. The Li-MnO$_2$ cells are also known in the art in which manganese dioxide which is the cathode active material of the manganese dry cell is used as the cathode active material. These cells are inexpensive to manufacture because the manganese dioxide is readily available at low costs.

Such manganese dioxide may for example be $\gamma$-MnO$_2$ such as chemical manganese dioxide (CMD) obtained by addition of an alkali permanganate solution to a boiling neutral manganese sulfate solution, or electrolytic manganese dioxide (EMD) obtained by electrolytic oxidation from the acid bath of manganese sulfate or manganese chloride, as in the case of aforementioned manganese dry cell. These $\gamma$-MnO$_2$ forms are not desirable because they contain a large amount of water which may react with metal lithium of the anode active material to cause an electrolyte leakage or corrosion of the battery can or otherwise deteriorate the preservative character of the cell. In addition the cell capacity may be lowered due to admixture of Mn$_2$O$_3$ which is not an active material. It is also known to make use of manganese dioxide obtained by heat-treating the aforementioned $\gamma$-MnO$_2$ at a temperature of the order of 150° to 450° C. for removing the water content. (It should be noted that the resulting manganese dioxide has undergone changes in the crystal structure by the heat-treating temperature so that it exhibits a $\gamma$-phase at lower than 250° C., a $\gamma.\beta$-phase at 250° to 350° C. and a $\beta$-phase at higher than 350° C.). Although an improvement is attained in this case, satisfactory results have not been obtained with respect to increasing the cell capacity or realizing an improved flatness of the discharge voltage.

Above all, when the lithium-manganese dioxide cell is used as a backup power supply for the IC memory, an improved flatness of the discharge voltage and an increased capacity of the cell are desired, so that a demand exists for further improving the cathode active material.

SUMMARY OF THE INVENTION

It is an object of the present invention to provide an improved cathode active material for a lithium-manganese dioxide cell.

It is a further object of the present invention to provide a lithium-manganese dioxide cell showing an improved flatness in the discharge voltage.

It is a further object of the present invention to provide a lithium-manganese dioxide cell showing an increased capacity.

Thus the present invention resides in a lithium-manganese dioxide cell characterized in that manganese dioxide showing a diffraction peak in the vicinity of the diffraction crystal lattice distance d=3.60 Å when subjected to an X-ray diffraction after discharging is used as the cathode active material.

DETAILED DESCRIPTION OF THE PREFERRED EMBODIMENTS

Figure 1:
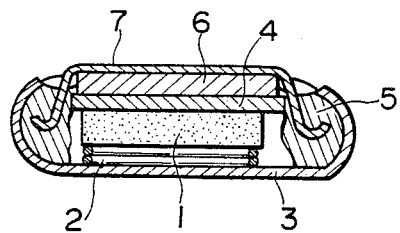
FIG. 1 is a sectional view showing the construction of the lithium-manganese dioxide cell embodying the present invention.

The present inventors have conducted researches into a lithium-manganese dioxide cell showing an improved flatness in the discharge voltage and a large discharge capacity and found that manganese dioxide exhibiting a peculiar X-ray diffraction peak after discharging of the cell is useful for achieving a flat discharge voltage and an improved capacity. The present invention has been completed on the basis of this finding and is characterized by using as cathode active material manganese dioxide exhibiting an X-ray diffraction peak in the vicinity of the diffraction crystal lattice distance d=3.60 Å after discharging of the cell.

Thus, as a result of our X-ray diffraction analysis which was conducted after discharging of the cell, it has been found that an improvement may be attained in the flatness of the discharge voltage and the cell capacity by using as the cathode active material of the lithium-manganese dioxide cell manganese dioxide exhibiting the diffraction peak in the vicinity of the diffraction crystal lattice distance d=3.60 Å ($2\theta=31.2°$ where a Fe target and a Mn filter are used; $\theta$ being a diffraction angle).

According to the present invention, manganese dioxide may be prepared by any of the following methods.

(i) Electrolytic manganese dioxide (EMD) or chemical manganese dioxide (CMD) is thermally decomposed to dimanganese trioxide (Mn$_2$O$_3$) to which nitric acid is added and the resulting mixture is heat-treated two or more times.

(ii) EMD or CMD is heat-treated to give a product to which nitric acid is added and the resulting mixture is heat-treated.

(iii) EMD or CMD is added to nitric acid and the resulting product is heat-treated.

(iv) manganese nitrate is thermally decomposed to a product to which nitric acid is added and the resulting product is subjected to at least one operation of thermal decomposition.

High-purity $\beta$-manganese dioxide may be obtained by resorting to any of the above-described methods, which will now be explained in more detail.

Method (i)

It has been found that EMD or CMD may be thermally decomposed at a higher temperature in advance and converted in this manner into dimanganese trioxide to which nitric acid is added and the resulting mixture is heat-treated to high-purity $\beta$-MnO$_2$. Thus, EMD or CMD is thermally decomposed to dimanganese trioxide (Mn$_2$O$_3$) to which nitric acid is added and the resulting mixture is heat-treated two or more times.

In this manner, according to the present invention, $\gamma$-MnO$_2$ such as EMD or CMD is used as the starting material and previously thermally decomposed for liberation of oxygen and conversion into Mn$_2$O$_3$.

The temperature for thermal decomposition for $\gamma$-MnO$_2$ is preferably in the range from 500° to 800° C. When the decomposition temperature exceeds 800° C., Mn$_2$O$_3$ liberates oxygen further to be undesirably converted into Mn$_3$O$_4$.

Nitric acid is then added to the resulting Mn$_2$O$_3$ and the resulting mixture is heat-treated two or more times. According to our experiments, Mn$_2$O$_3$ is oxidized only insufficiently by a sole heat treatment operation under addition of nitric acid so that Mn$_2$O$_3$ may remain as impurities.

The heat treatment temperature with addition of nitric acid is preferably in the range from 170° to 500° C. With the heat treatment temperature higher than 500° C., the resulting $\beta$-MnO$_2$ may be decomposed further to Mn$_2$O$_3$ as impurities. 0.4 ml or more of 13N nitric acid (0.52 gram equivalents) is preferably added to 1.00 g of Mn$_2$O$_3$ during heat treatment.

High-purity $\beta$-MnO$_2$ may be produced by two or more heat treatments with addition of nitric acid.

Method (ii)

EMD or CMD is previously heat-treated at an elevated temperature so as to be converted into a $\beta$-MnO$_2$/Mn$_2$O$_3$ mixture, to which nitric acid is added and the resulting mixture is heat-treated to high purity MnO$_2$. Briefly, the present method consists in heat-treating EMD or CMD adding nitric acid to the resulting product and heat-treating the resulting mixture.

Thus, according to the present invention, $\gamma$-MnO$_2$ such as EMD or CMD is used as starting material, and heat-treated under a temperature of 420° to 650° C.

The product resulting from the heat treatment is a mixture consisting of Mn$_2$O$_3$ resulting from thermal decomposition and $\beta$-MnO$_2$ which is the phase-transition product of the aforementioned $\gamma$-MnO$_2$.

Then, nitric acid is added to a mixture of Mn$_2$O$_3$ with $\beta$-MnO$_2$ resulting from the heat treatment and the resulting mixture is again heated for effecting a further heat treatment.

The temperature of the heat treatment with nitric acid is preferably 170° to 500° C. With the heat treatment temperature exceeding 500° C., the resulting $\beta$-MnO$_2$ may be further decomposed to Mn$_2$O$_3$ as impurities. During such heat treatment, 0.4 ml or more of 13N nitric acid (0.52 gram equivalent) is preferably used to 1.00 g of the product of thermal decomposition of $\gamma$-MnO$_2$ (a $\beta$-MnO$_2$/Mn$_2$O$_3$ mixture). With the amount of nitric acid being less than 0.52 gram equivalent, oxidation may be insufficient and Mn$_2$O$_3$ may remain as impurities.

The above-described heat treatment with the addition of nitric acid may be performed once and for all, but may be performed two or more times, as the occasion may demand.

With the above-described method, extremely high purity $\beta$-MnO$_2$ may be obtained. Our thermal analysis of the resulting $\beta$-MnO$_2$ has revealed that a good coincidence exists between the weights of the $\beta$-MnO$_2$ before and after thermal decomposition for analysis and that hence the resulting $\beta$-MnO$_2$ is substantially free of impurities or water contents. The above-described analysis has also revealed that the resulting $\beta$-MnO$_2$ is stable at or near 500° C. and hence the small amount of water that may possible be contained may be substantially removed by high-temperature heat treatment.

Method (iii)

It has been found that EMD or CMD may be promptly converted into $\beta$-MnO$_2$ at a lower temperature through phase transition by addition of nitric acid followed by heating. Briefly, the method resides in adding nitric acid to EMD or CMD and heat-treating the resulting product.

Thus, according to the present invention, to EMD or CMD prepared as starting material is added nitric acid, and the resulting mixture is heat-treated.

A heat treatment temperature higher than 170° C. is sufficient to cause phase transition from $\gamma$-MnO$_2$ to $\beta$-MnO$_2$. However, it is preferred to use the lowest temperature possible. With a higher heat treatment temperature, the resulting MnO$_2$ may be decomposed to liberate oxygen and to be converted into Mn$_2$O$_3$.

Also, during heat treatment, 0.4 ml or more of 13N nitric acid (0.52 gram equivalent) is preferably used to 1.00 g of EMD or CMD. The heat treatment may be repeated a number of times as the occasion may demand.

By the above-described heat treatment with addition of nitric acid, EMD or CMD may promptly undergo phase transition to $\beta$-MnO$_2$ of high purity and extremely small particle size without yielding impurities through thermal decomposition.

Method (iv)

It has been found that $\beta$-MnO$_2$ of extremely high purity may be obtained by addition of nitric acid to the thermal decomposition product of manganese nitrate followed by further heating and heat treatment. Briefly, the method resides in addition of nitric acid to a thermal decomposition product of manganese nitrate followed by a sole operation of thermal decomposition.

Thus, in accordance with the present invention, manganese nitrate is subjected to thermal decomposition. While manganese nitrate is known to exist as hexahydrate, tetrahydrate, trihydrate, dihydrate, monohydrate or anhydrous salt, manganese nitrate is usually available and used in the form of hexahydrate (Mn(NO$_3$)$_2$.6H$_2$O).

The thermal decomposition temperature is preferably 170° to 500° C. With the temperature lower than 170° C., thermal decomposition is insufficient. With the temperature higher than 500° C., the resulting $MnO_2$ may be further decomposed to liberate oxygen to be converted to $Mn_2O_3$.

Nitric acid is then added to the thermal decomposition product to which nitric acid is added and the resulting product is again heated for effecting a further thermal decomposition. The temperature employed for the further thermal decomposition is also preferably 170° to 500° C. similarly to the preceding thermal decomposition. For the further thermal decomposition, 0.52 gram equivalent of nitric acid is preferably used to 1.00 g of the thermal decomposition product. The operation of thermal decomposition may be repeated any number of times as the occasion may demand. By thus repeating thermal decomposition, the resulting $\beta\text{-}MnO_2$ may be improved further in purity.

High-purity $\beta\text{-}MnO_2$ may be obtained by the further thermal decomposition with nitric acid.

The present invention is not limited to manganese dioxide obtained by the above-described methods. For example, various manganese dioxides may be checked in advance as to the presence or absence of the aforementioned diffraction peak after discharging and selectively used as cathode active material.

It is not clear at present to which materials the diffraction peak $d = 3.60$ Å in the above described X-ray diffraction is attributed or which role is played by these materials in achieving a flatness in the electrical discharge voltage or improving cell capacity. However, considering that the diffractive peak is not recognized before discharging, it may be surmised that these materials do play some role in the discharge mechanism.

The description with reference to several specific examples of the present invention is given hereinbelow. However, it is to be understood that these examples are given only by way of illustration and are not intended to limit the scope of the present invention.

EXAMPLE 1

A commercially available electrolytic manganese dioxide (manufactured by Toyo Soda Co., Ltd., 'HS') was heated to 600° C. at the rate of 50° C. per hour so as to be converted to $Mn_2O_3$, single phase, by thermal decomposition.

Dimanganese trioxide ($Mn_2O_3$) thus obtained by thermal decomposition was charged into a porcelain pot or crucible. Then, concentrated nitric acid (13N) was added to $Mn_2O_3$ at a rate of 0.4 ml to 1 g of $Mn_2O_3$ and the resulting mixture was charged into an electrical oven so as to be heated to 280° C. at the rate of 12° C. per hour for effecting a heat treatment. To the resulting heat-treated product was again added concentrated nitric acid in an amount equal to that used in the preceding heat treatment and the resulting product was heated to 280° C. at the rate of 12° C. per hour for effecting a second heat treatment.

The resulting product is $\beta\text{-}MnO_2$ single phase.

Then, a lithium-manganese dioxide cell was prepared by using as the cathode active material the resulting $\beta\text{-}MnO_2$ crystals having X-ray grain size $r_{110} = 390$ Å and $r_{101} = 430$ Å. Thus, 90 weight parts of the above specified $\beta\text{-}MnO_2$, 8 weight parts of carbon fluoride are kneaded together, molded under pressure and sufficiently dried in vacuum to cathode pellets 1. These pellets are assembled into a battery cathode can 3 through the medium of a spring 2 as shown in FIG. 1. A separator 4 is placed on the pellets 1 and a solution of 1 mol of lithium perchlorate (Li $ClO_4$) per liter of mixed solvent of propione carbonate 1, 2-dimethoxyethane is charged as electrolyte. A anode can 7 filled with metal lithium 6 as anode active material is placed thereover by the medium of a gasket 5 and the opening is then sealed for completing a lithium-manganese dioxide cell.

In a lithium-manganese dioxide cell, metal lithium as anode active material is generally used in an amount stoichiometrically equal to manganese dioxide as cathode active material. However, in the present embodiment, for correctly evaluating the properties of manganese dioxide as cathode active material, metal lithium as anode active material is used in an amount larger than that of manganese dioxide in such a manner that the evaluation is not affected by the amount of metal lithium.

Discharge characteristics of the thus obtained lithium-manganese dioxide cell were measured. By the similar process, five samples of the above described cell were prepared and their discharge characteristics are measured. The results were shown in FIG. 2.

Figure 2:
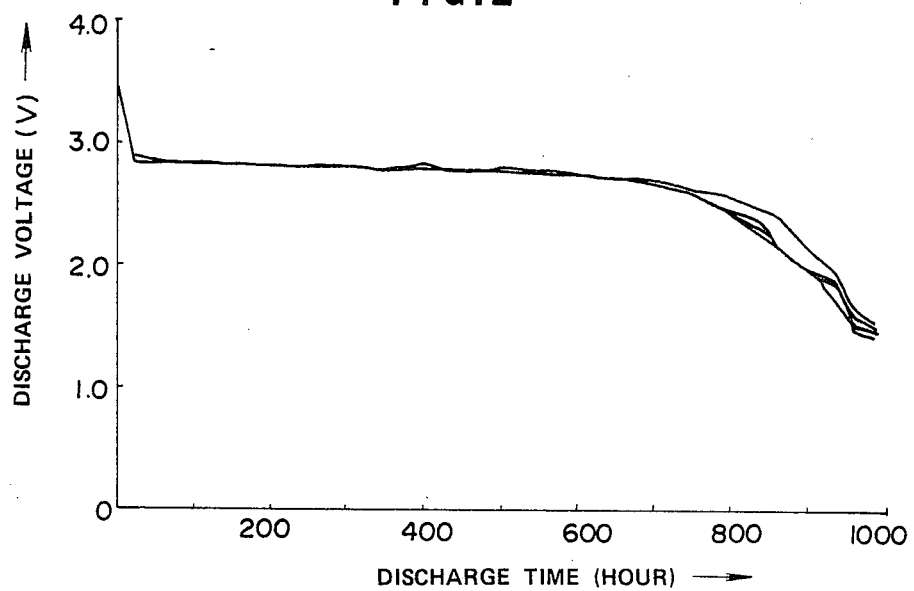
FIG. 2 is a chart showing discharge characteristics according to an embodiment of the present invention.

It is seen from FIG. 2 that the lithium-manganese dioxide cell of the present embodiment shows an improved flatness in the discharge voltage and a larger capacity. For example, the discharge time until the discharge voltage is lowered to 2.6 V is about 750 hours, while that until the discharge voltage is lowered to 2.4 V is more than 800 hours. In addition, the discharge characteristics vary only slightly from one sample to another and the cell is highly stable in quality.

Figure 3:
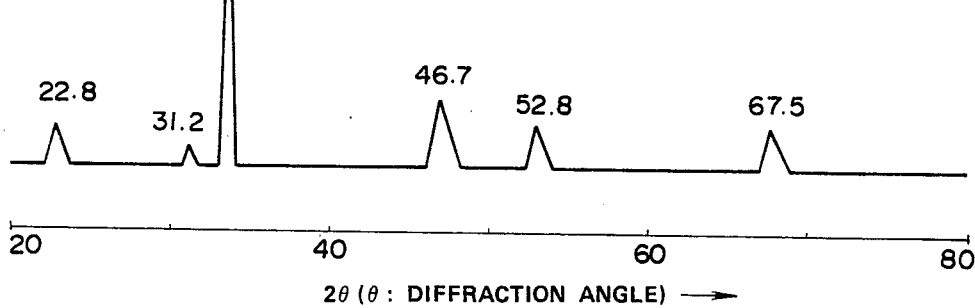
FIG. 3 schematically shows the X-ray diffraction spectrum thereof after discharging.

One of the cathode pellets 1 was taken out of the lithium-manganese dioxide cell for X-ray diffraction analysis after termination of the measurement and after discharging of the cell. The discharging end point was assumed to be reached when the discharge voltage of the cell was lowered to 1.4 V. In the X-ray analysis, an Fe target and a Mn filter are employed. The X-ray diffraction spectrum thus obtained is shown only schematically in FIG. 3.

In this X-ray diffraction spectrum, the diffraction peak is noted to exist at $2\theta = 31.2°$, viz., $d = 3.60$ Å.

EXAMPLE 2

A commercially available electrolytic manganese dioxide ('HS' manufactured by Toyo Soda Co., Ltd.) was thermally decomposed for two hours at 550° C. to a mixed product of $Mn_2O_3$ and $\beta\text{-}MnO_2$.

The mixed product was taken in a porcelain crucible into which concentrated nitric acid (13N) was added at a rate of 0.4 ml to 1 g of the product. The crucible was then charged into an electrical oven and heat-treated by heating to 280° C. at a rate of 12° C. per hour. Into this mixture was further added concentrated nitric acid and the mixture was again subjected to the above described heat treatment.

The resulting product was single-phase $\beta\text{-}MnO_2$. Of these crystals, only those having the X-ray grain size $r_{110} = 210$ Å and $r_{101} = 280$ Å were used as the cathode active material for preparing the lithium-manganese dioxide cell by using a method similar to that of Example 1.

Discharge characteristics of the lithium-manganese dioxide cell were measured. Five samples of the cell are prepared by using the similar process and their discharge characteristics were measured. The results were shown in FIG. 4.

Figure 4:
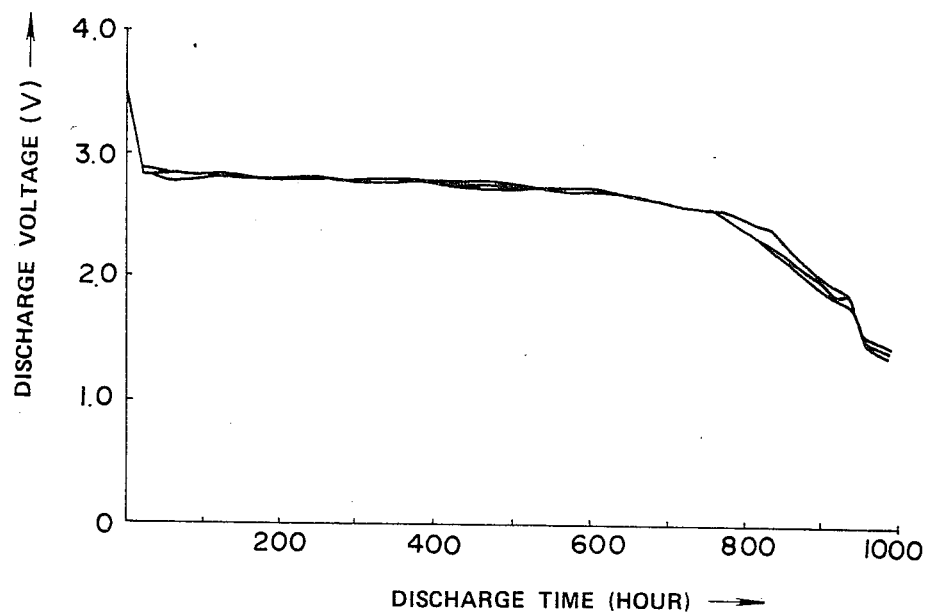
FIG. 4 shows discharge characteristics of another embodiment of the present invention.

It is seen from FIG. 4 that the lithium-manganese dioxide cell of the present embodiment also shows an improved flatness in the discharge voltage and a larger capacity. For example, the discharge time until the discharge potential is lowered to 2.6 V is about 730 hours and the discharge time until the discharge potential is lowered to 2.4 V is more than 800 hours. It is also seen that the discharge characteristics vary only slightly from one sample to another and the cell is of stable and uniform quality.

Figure 5:
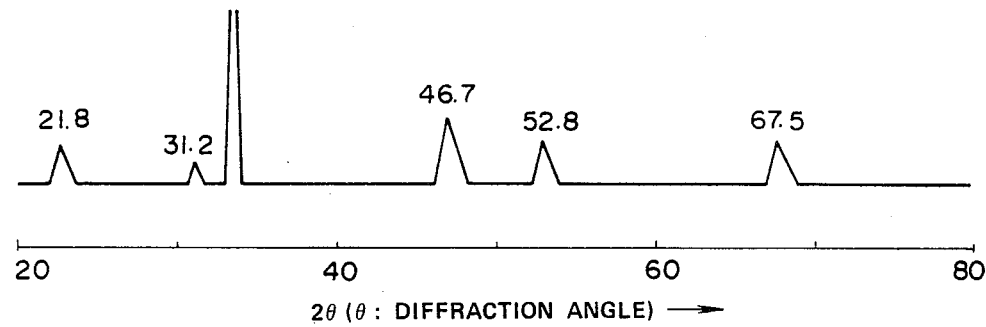
FIG. 5 schematically shows the X-ray diffraction spectrum thereof after discharging.

One of the cathode pellets was taken out of the lithium-manganese dioxide cell for X-ray diffraction analysis after termination of the measurement and after discharging of the cell. The discharging end point was assumed to be reached when the discharge potential of the cell is lowered to 1.4 V. In the X-ray analysis, an Fe target and a Mn filter are employed. The X-ray diffraction spectrum is shown only schematically in FIG. 5.

In this X-ray diffraction spectrum, the diffraction peak is noted to exist at $2\theta = 31.2°$, viz. d=3.60 Å.

Comparative Example 1

A commercially available electrolytic manganese dioxide was used as cathode active material and the lithium-manganese dioxide cell was prepared by using a method similar to that of the preceding

EXAMPLE 1.

Figure 6:
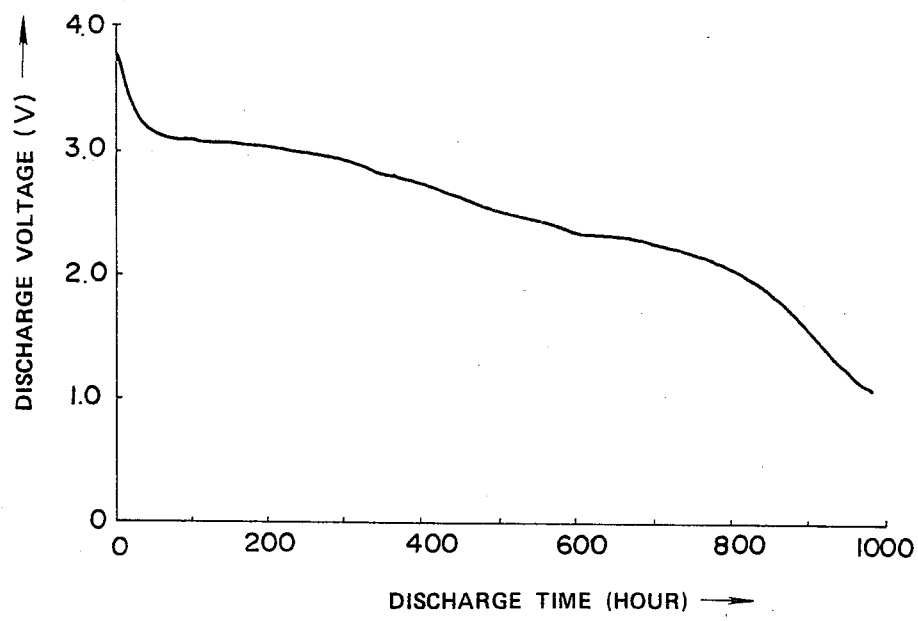
FIG. 6 shows discharge characteristics of a comparative embodiment.

Discharge characteristics of the resulting cell were measured and the results shown in FIG. 6 were obtained. The cell obtained in the present Example shows marked decrease in the discharge potential while the discharge time until the potential is lowered to 2.6 V was only about 450 hours and that until the potential is lowered to 2.4 V is only about 600 hours.

Figure 7:
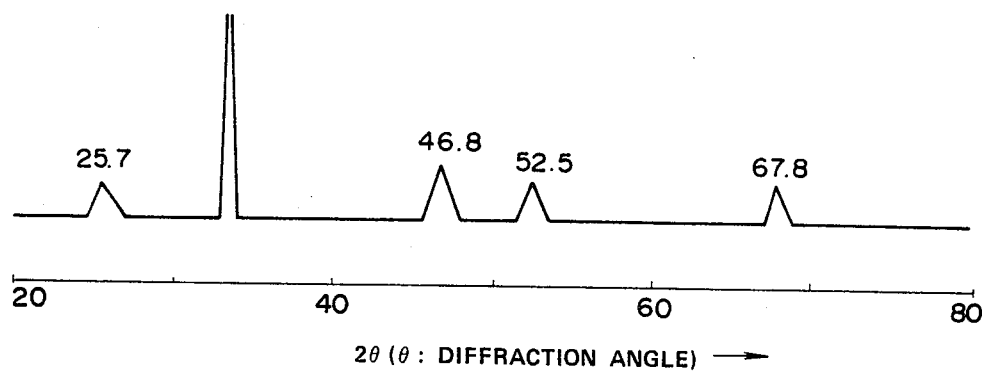
FIG. 7 schematically shows the X-ray diffraction spectrum thereof after discharging.

After discharging of the cell, that is, when the discharge potential is lowered to 1.4 V, the cathode pellet is taken out and subjected to an X-ray diffraction analysis. As shown in FIG. 7, the diffraction peak at d=3.60 Å is not noted to exist.

Comparative Example 2

The commercially available electrolytic manganese dioxide is heat-treated at 350° C. for 7 hours and used as cathode active material for preparing the lithium-manganese dioxide by using a method similar to that used in the Example 1.

Figure 8:
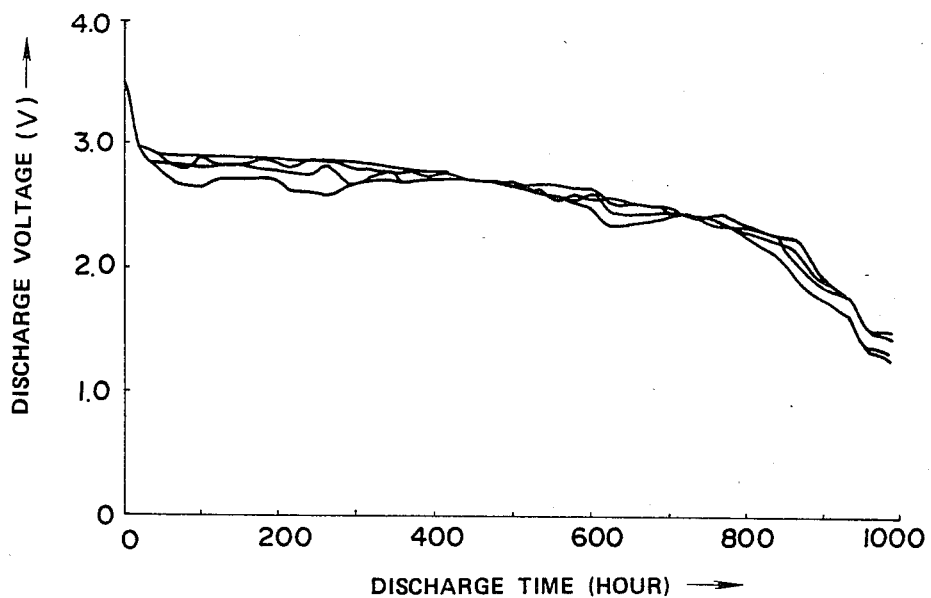
FIG. 8 shows discharge characteristics of another comparative embodiment.

Five cell samples are prepared by using the above described method and their discharge characteristics are measured. The results are shown in FIG. 8. It is seen from FIG. 8 that the cell obtained by the present Example shows a rather unstable discharge potential and the discharge characteristics that vary appreciably from one sample to another, while the discharge time until the discharge potential is lowered to 2.6 V and 2.4 V is shorter than in the preceding Examples and equal only to about 500 to 600 hours and about 750 hours, respectively.

Figure 9:
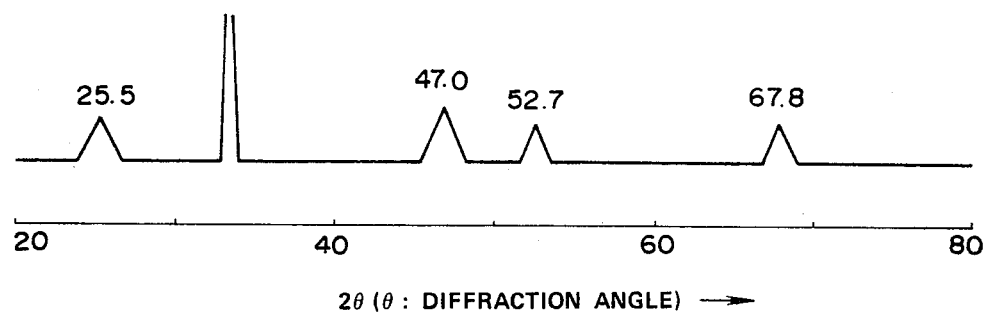
FIG. 9 schematically shows the X-ray diffraction spectrum thereof after discharging.

After discharging, that is, when the discharge potential is lowered to 1.4 V, the cathode pellet was taken out and subjected to an X-ray diffraction analysis. As shown in FIG. 9, the diffraction peak at d=3.60 Å was not noted to exist.

Comparative Example 3

A commercially available electrolytic manganese dioxide was heat-treated at 450° C. for 20 hours and used as cathode active material for preparing the lithium-manganese dioxide by using the method similar to that used in the Example 1.

Figure 10:
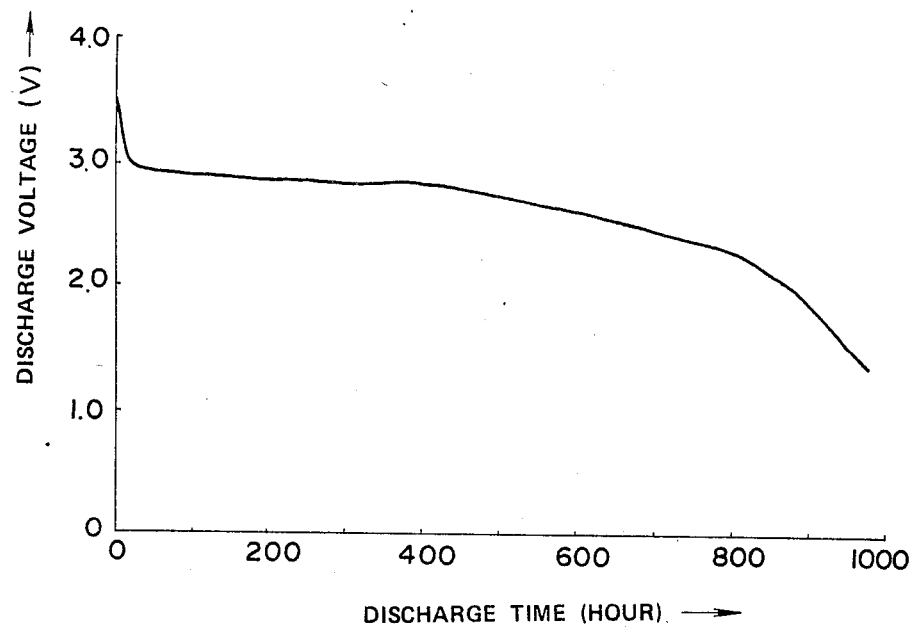
FIG. 10 shows discharge characteristics of a further comparative embodiment.

The discharge characteristics of cell are measured and the results as shown in FIG. 10 are obtained. It is seen that the discharge time of the cell until the potential is lowered to 2.6 V and 2.4 V is only about 600 hours and 750 hours, respectively and the electrical capacity of the cell is smaller than that of the cell obtained in the preceding Examples.

Figure 11:
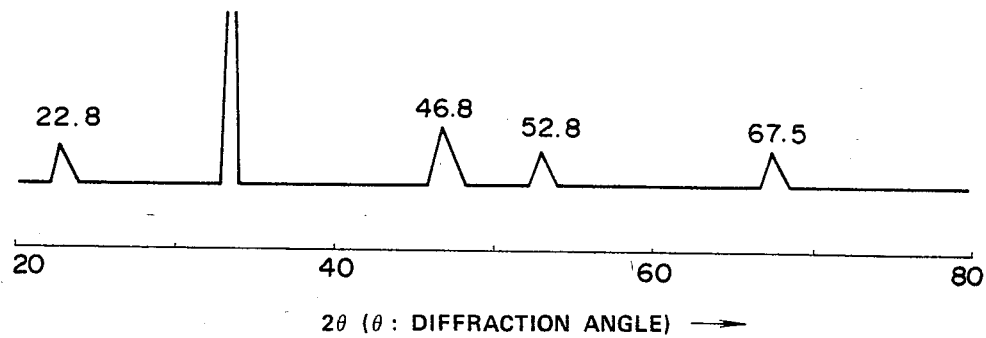
FIG. 11 schematically shows the X-ray diffraction spectrum thereof after discharging.

After discharging, that is, when the discharge potential is lowered to 1.4 V, the cathode pellet was taken out and subjected to an X-ray diffraction analysis. As shown in FIG. 11, the peak of diffraction at d=3.60 Å is not noted to exist.

What is claimed is:

1. Manganese dioxide having an X-ray diffraction peak at a diffraction angle $2\theta$ of about 31.2° when analyzed after discharging in a lithium-manganese dioxide cell to a potential of 1.4 volts comprising a cathode composed of said manganese dioxide, an anode composed of metal lithium and an electrolyte interposed therebetween.

2. A lithium-manganese dioxide cell comprising a cathode composed of manganese dioxide, an anode composed of metal lithium and an electrolyte interposed therebetween, said manganese dioxide having an X-ray diffraction peak at a diffraction angle $2\theta$ of about 31.2° when analyzed after said cell is discharged to a potential of 1.4 volts.

3. A lithium-manganese dioxide cell according to claim 2, wherein said manganese dioxide is obtained by a method comprising the steps of:
   (a) thermally decomposing electrolytic manganese dioxide (EMD) or chemical manganese dioxide (CMD) to prepare dimanganese trioxide;
   (b) mixing nitric acid and said dimanganese trioxide to prepare a mixture thereof;
   (c) heat-treating said mixture; and
   (d) repeating step (b) and step (c) at least twice.

4. A lithium-manganese dioxide cell according to claim 3, wherein the thermal decomposition temperature is in the range from 500° C. to 800° C.

5. A lithium-manganese dioxide cell according to claim 3, wherein the heat-treating temperature is in the range from 170° C. to 500° C.

6. A lithium-manganese dioxide cell according to claim 2, wherein said manganese dioxide is obtained by a method comprising the steps of:
   (a) heat-treating electrolytic manganese dioxide (EMD) or chemical manganese dioxide (CMD);
   (b) mixing nitric acid and thus heat-treated EMD or CMD to prepare a mixture thereof;
   (c) heat-treating said mixture.

7. A lithium-manganese dioxide cell according to claim 6, wherein the heat-treating temperature of electrolytic manganese dioxide (EMD) or chemical manganese dioxide (CMD) is in the range from 420° C. to 650° C.

8. A lithium-manganese dioxide cell according to claim 6, wherein the heat-treating temperature of the mixture is in the range from 170° to 500° C.

9. A lithium-manganese dioxide cell according to claim 2, wherein said manganese dioxide is obtained by a method comprising the steps of:
   (a) mixing nitric acid and electrolytic manganese dioxide (EMD) or chemical manganese dioxide (CMD) to prepare a mixture thereof;
   (b) heat-treating said mixture.

10. A lithium-manganese dioxide cell according to claim 9, wherein the heat-treating temperature is higher than 170° C.

11. A lithium-manganese dioxide cell according to claim 2, wherein said manganese dioxide is obtained by a method comprising the steps of:
 (a) thermally decomposing manganese nitrate to prepare a thermally decomposed product;
 (b) mixing nitric acid and said product to prepare a mixture thereof;
 (c) thermally decomposing said mixture;
 (d) repeating step (b) and step (c) at least once.

12. A lithium-manganese dioxide cell according to claim 11, wherein the thermal decomposition temperature of manganese nitrate is in the range from 170° C. to 500° C.

13. A lithium-manganese dioxide cell according to claim 11, wherein the thermal decomposition temperature of the mixture is in the range from 170° C. to 500° C.

* * * * *